United States Patent [19]

Frankel et al.

[11] 4,083,816

[45] Apr. 11, 1978

[54] ACETOXYMETHYL DERIVATIVES OF POLYUNSATURATED FATTY TRIGLYCERIDES AS PRIMARY PLASTICIZERS FOR POLYVINYLCHLORIDE

[75] Inventors: Edwin N. Frankel; Everett H. Pryde, both of Peoria, Ill.

[73] Assignee: The United States of America as represented by the Secretary of Agriculture, Washington, D.C.

[21] Appl. No.: 699,920

[22] Filed: Jun. 25, 1976

[51] Int. Cl.$^2$ .................. C08K 5/10; C08L 91/00; C11C 3/04; C11C 3/12
[52] U.S. Cl. .................. 260/31.2 R; 260/31.4 R; 260/31.6; 260/405; 560/230; 560/226
[58] Field of Search .................. 260/31.8 R, 31.2 R, 260/405, 410.6, 410.7, 409, 488 J, 23 XA, 31.4 R, 31.6, 31.8 HA

[56] References Cited

U.S. PATENT DOCUMENTS

| | | | |
|---|---|---|---|
| 2,514,424 | 7/1950 | Smith | 260/23 XA |
| 3,270,035 | 8/1966 | Roe et al. | 260/31.8 R |
| 3,328,427 | 6/1967 | Melaas | 260/410.6 |

OTHER PUBLICATIONS

Chem. Abstract, vol. 81, entry 58752f.
Journal of American Oil Chemistry Society, vol. 52, pp. 498–504, Frondel, Neff, Thomas, Khoe, Pryde, Riser.

*Primary Examiner*—Joseph E. Schuter
*Assistant Examiner*—Peter F. Kulkosky
*Attorney, Agent, or Firm*—M. Howard Silverstein; David G. McConnell; Curtis P. Ribando

[57] ABSTRACT

Acetoxymethyl derivatives of mono- and polyunsaturated fatty compounds including their vegetable oil triglycerides were prepared and found to function as primary plasticizers. Polyvinylchloride resins plasticized by the derivative compositions of the invention have permanance properties equal or superior to resins plasticized by dioctyl phthalate, dioctyl sebacate, or other commercial plasticizers.

23 Claims, No Drawings

ACETOXYMETHYL DERIVATIVES OF POLYUNSATURATED FATTY TRIGLYCERIDES AS PRIMARY PLASTICIZERS FOR POLYVINYLCHLORIDE

BACKGROUND OF THE INVENTION

1. Field of the Invention

This invention relates to novel oxo-derived fatty compounds, their method of preparation, and their use as primary plasticizers for polyvinylchloride (PVC).

2. Description of the Prior Art

A plasticizer is a material which is incorporated in a plastic and which functions to increase its workability and flexibility. The search for acceptable plasticizers has been a very active one. In 1934 about 56 plasticizers were being produced and from that time until about 1943, over 20,000 plasticizer compositions had been disclosed in the literature, 60 of which are among the 500 presently available (cf. Encyclopedia of Polymer Science and Technology, Vol. 10, John Wiley and Sons, Inc., 1969, p. 230).

Primary plasticizers are plasticizers which are miscible with the polymer in amounts sufficient to impart the desired characteristics to the final product without exuding. Secondary plasticizers are those which are not soluble in the polymer in the desired amounts and, therefore, must be used in smaller amounts in combination with another more compatible plasticizer. "Compatibility" is the term used to describe the ability of two or more substances to mix with each other to form a homogenous mixture. The desired plastic product is formed by vigorously mixing polymer and plasticizer at elevated temperature (about 160° C. for polyvinylchloride) until "fusion" takes place. Fusion is the mechanism by which plasticizer and polymer become a homogenous mixture and, therefore, the ease of fusion is directly related to compatibility.

It is generally believed that in PVC, ease of fusion tends to decrease with increasing molecular size and decreasing polarity, and that addition of a carbon atom linkage to the plasticizer molecule causes a reduction in its compatibility for PVC (Encyclopedia of Polymer Science and Technology, supra, p. 250). Moreover, it would be expected that the addition of several carbon atoms would reduce compatibility even further.

The types of organic plasticizers in general use are liquids having moderately high molecular weights and include esters of carboxy acids, esters of phosphoric acids, hydrocarbons, halogenated hydrocarbons, ethers, polyglycols, and sulfonilamides. For reasons of compatibility, costs, process behavior, and performance, primary PVC plasticizers are limited to various dibasic acids and phosphate esters, epoxidized oils and resins, glycolates, mellitates, and polyesters of various dibasic acids with glycols, pentaerythritol derivatives, and sulfonates. Secondary PVC plasticizers are generally limited to various aromatic and mixed aromatic aliphatic oils, chlorinated paraffins, polyalpha-methyl styrene derivatives and esters of high molecular weight alcohols, and organic acid (cf. Modern Plastics Encyclopedia, Vol. 50, No. 1A, 1973-74, pp. 254-266).

Dioctyl phthalate (DOP) is the most widely used primary plasticizer for polyvinylchloride and accounts for about 25% of the total market (Encyclopedia of Polymer Science and Technology, supra, p. 231). However, because of its volatility, migration, and incomplete biodegradability, DOP is suspect as a ubiquitous environmental contaminant. Other commercial plasticizers such as dioctyl sebacate (DOS) and dioctyl azelate (DOZ) suffer from high percent migration loss and poor compatibility with PVC. Any new plasticizer to be superior to DOP would have to show lower volatility, migration, and solvent extractability, as well as better biodegradability.

Efforts to find a substitute for DOP as a primary plasticizer have led to the investigation of derivatives of oxonation products of $C_{18}$ unsaturated fatty acids.

Gruber et al., U.S. Pat. No. 2,332,849, teaches oxidizing and esterifying oleic acid to trans-9,10-dihydroxystearic acid methyl ester, which is then reacted with acetic anhydride to yield trans-9,10-diacetoxy stearic acid methyl ester.

Knight et al., J. Amer. Oil Chem. Soc. 36: 382-388 (Sept. 1959), reports on a number of acyloxy and aryloxy compounds prepared from hydroxystearic acids.

Birum et al., U.S. Pat. No. 2,965,598, oxidizes the oxonation products of oleic acid and oleic acid esters and subsequently esterifies the resultant acids with a series of alcohols. The resultant esters have some utility as plasticizers.

Wheeler et al., U.S. Pat. No. 3,016,359, prepares plasticizers by an oxonation reaction similar to that of Birum et al., supra, and further teaches other $C_{18}$ unsaturated acids as the starting material. Specifically taught are linoleic, linolenic, ricinoleic, and elaidic acids.

Bhatnagar et al., Ind. Chem. J., Ann., pp. 136-137 (1972), produces primary plasticizers by epoxidization of acetylated castor oil and by the acetylation of ricinoleates of glycerol.

Awl et al. [U.S. Published Patent Application B 485,060 (Feb. 7, 1976); J. Amer. Oil Chem. Soc. 49(4): 222-228 (1972); and J. Amer. Oil Chem. Soc. 51(5): 224-228 (1974)] reports on the plasticizing properties of ethylene acetals and dimethyl acetals from hydroformylated polyunsaturated vegetable oils and esters.

Frankel et al., J. Amer. Oil Chem. Soc. 52(12): 498-504 (1975), reports on a number of acyl esters from oxo-derived hydroxymethylstearates and compares them to the compounds of the instant invention and various commercial plasticizers.

All of the prior art compounds discussed above exhibited some plasticizing properties. However, it has generally been observed that none of the heretofore known unsaturated fatty compound oxo-derivatives are significantly superior to DOP to successfully replace it as the leading plasticizer for PVC where improved permanence is desired. The primary problem in the art exists in combining good thermal stability and low migration and volatility with satisfactory compatibility.

SUMMARY OF THE INVENTION

The object of this invention is the provision of compositions which are useful as primary plasticizers for PVC, which are easily prepared from inexpensive starting materials such as unsaturated fatty acid compounds, particularly their vegetable oil triglycerides, and which impart to the PVC permanence properties superior to those of PVC compositions plasticized with commercially available plasticizers such as DOP. Incidental with the fulfillment of this objective is the development of an important application for unsaturated vegetable oils, and the elimination of DOP as an environmental contaminant.

In accordance with the above objects, we have found a method of preparing primary plasticizers for PVC comprising the following sequence of steps:
(1) hydroformylation of the unsaturated fatty compound;
(2) hydrogenation of the hydroformylated product of step (1); and
(3) acetylation or trichloroacetylation of the hydrogenated product of step (2).

The compositions thus prepared are then fused in plasticizer amounts with PVC.

DESCRIPTION OF THE PREFERRED EMBODIMENTS

In view of the prior art teachings that oxo-derived fatty compounds including acetoxy- and polyacetoxystearates exhibit a commercially unacceptable combination of thermal stability, permanence, and PVC compatibility, it was surprising to discover that acetoxymethyl, polyacetoxymethyl, and trichloroacetoxymethyl derivatives of mono- and polyunsaturated fatty compounds including their vegetable oil triglycerides were superior to DOP as PVC plasticizers. The term "acetoxymethyl derivatives" will be used in the following description to generically refer to the poly- and trichloro- derivatives as well.

The acetoxymethyl substituents of the compounds of the instant invention have the following general structural formulas:

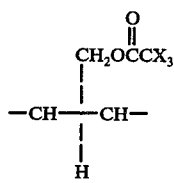

where X = H or Cl⁻ and the methylene groups are the unsaturated carbons of the starting material. The designation

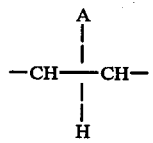

where A is CHO, CHOH, $CH_2OC-CH_3$, or $CH_2OC-CCl_3$ is defined herein to refer to the positional isomers resulting from attachment to either one of the carbon atoms at a given site of unsaturation in the fatty compound.

Useful starting materials for the preparation of the instant plasticizers include any of the mono- and polyunsaturated fatty acids, their alkyl esters, or their vegetable oil triglycerides. Of particular interest are the following common $C_{18}$ mono-, di-, and triunsaturated fatty compounds:

I
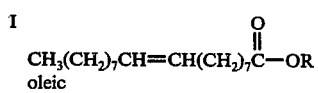
oleic

II
linoleic

III
$$CH_3CH_2CH=CHCH_2CH=CHCH_2CH=CH(CH_2)_7\overset{O}{\underset{\|}{C}}-OR$$
linolenic IV
$$CH_3(CH_2)_5\overset{OH}{\underset{|}{C}H}CH_2CH=CH(CH_2)_7\overset{O}{\underset{\|}{C}}-OR$$
ricinoleic in which for each of the formulas I–IV, R = H, lower alkyl ($C_1$–$C_5$), or

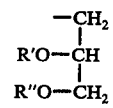

where R' and R" = the acyl radicals of any of formulas I–IV. These starting materials are readily available from safflower oils, linseed oil, castor oil, soybean oil, cottonseed oil, peanut oil, and sunflower seed oil. It is to be understood, however, that other vegetable oils and other similar fatty compounds including positional isomers of compounds I–IV above would be equivalent starting materials for purposes of the invention.

For the sake of simplicity in the ensuing description, the above-mentioned starting materials will be generically referred to as unsaturated fatty compounds. The term "fatty compound" will be understood to mean any free fatty acid, fatty ester, triglyceride oil, or other fatty-derived material.

HYDROFORMYLATION

The first step in the reactive sequence is the hydroformylation of the unsaturated fatty compound. Any method can be employed which converts substantially all the unsaturation of the fatty components into the formyl derivatives. The preferred procedure is the method disclosed by E. N. Frankel (U.S. Pat. No. 3,787,459; and in Ann. N.Y. Acad. Sci. 214: 79–93, June 15, 1973) in which mono- and polyunsaturated fatty compounds, carbon monoxide, and hydrogen react in the presence of a supported rhodium metal-trisubstituted phosphine catalyst admixture to form the corresponding mono- and polyformyl products. As disclosed in U.S. Pat. No. 3,787,459, supra, a trisubstituted phosphite can also be used in the presence of the rhodium metal. Preferred would be either the triphenylphosphine or the triphenylphosphite.

In the preferred process, 5% (by weight) rhodium metal deposited on an inert support (i.e., carbon, calcium carbonate, or alumina) is used in the presence of triphenylphosphine to catalyze the reaction. From about 0.02 to 0.4% rhodium metal and from about 0.25 to 7% triphenylphosphine by weight of fatty compound is sufficient to produce the desired products. A suitable pressure vessel such as an autoclave is charged with the unsaturated fatty compound and the catalyst (with or without a solvent). The vessel is then filled with hydrogen and carbon monoxide in ratios of from 1:1 to 2:1 at total pressures of from 500 to 4,500 p.s.i.g., preferably 1,700–4,400 p.s.i.g. The reaction mixture is then heated and reaction begins when the temperature reaches approximately 90° C. The temperature in this preferred process is maintained at from 90° to 180° for up to 6 hr. and most preferably 90°–110° C. for 2–5 hr. The solid catalyst in the reaction mixture is then removed by filtration from the crude formyl products. The crude product may subsequently be purified by distillation.

It should be understood by anyone skilled in the art that parameters of time, temperature, pressure, and quantity of catalyst can be varied to a considerable extent. For example, a pressure of 1,700–4,400 p.s.i.g. is specified as being preferred only because of pressure limitations of the reaction vessel. If a higher pressure were used, the other parameters would have different limits. Therefore, the invention should not be limited to the parameters disclosed in the discussion above or in the examples.

The formyl stearic acid compounds resulting from the hydroformylation will have the formyl groups distributed substantially equally between the carbon atoms which were originally unsaturated. The reaction at each point of original unsaturation is represented thusly:

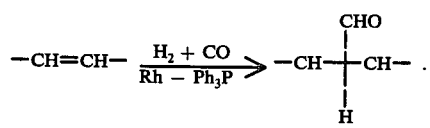

HYDROGENATION

The hydroformylated product is subsequently hydrogenated to the corresponding hydroxymethyl derivatives.

Any hydrogenation procedure is suitable which converts substantially all the formyl groups to hydroxymethyl groups. The preferred procedure is that of E. N. Frankel (J. Amer. Oil Chem. Soc. 48: 248, 1971), wherein the reaction is catalyzed with Raney nickel at 95°–111° C. and 500–1,000 p.s.i.g. of hydrogen. The reaction time under these conditions generally ranges from about 2–8 hr. and most often 4–6 hr.

Where it is desired to reduce an ester group of an unsaturated fatty compound such as oleic methyl ester, the hydroformylated compound is hydrogenated in two steps. First the formyl substituents are reduced as described above, or else in the presence of copper chromite at 150° C., then the carbomethoxy ester is hydrogenated further in the presence of copper chromite at about 280° C., and about 3,000 p.s.i.g.

When both steps are catalyzed with copper chromite, the reaction appears as follows, using hydroformylated oleic methyl ester as the example:

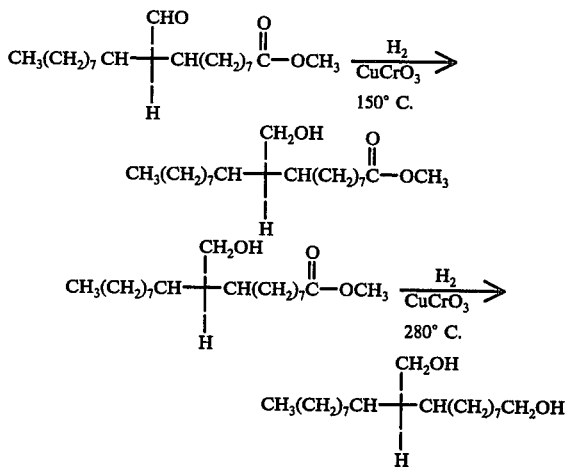

It may also be desirable to transesterify the hydrogenated product by reaction with an appropriate alcohol. Any transesterification procedure can be followed as known in the prior art.

ACETYLATION

The hydrogenated products are subsequently acetylated to convert the hydroxymethyl substituents to acetoxymethyl groups as represented below:

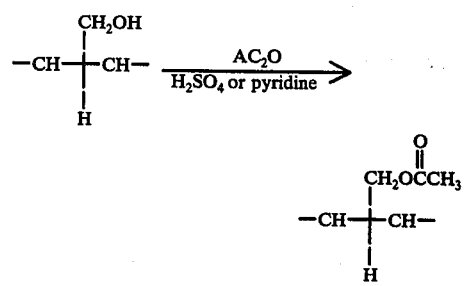

Any known acetylation procedure is acceptable. The preferred method is to reflux the hydrogenated product with excess acetic anhydride and $N_2$ bubbling in the presence of a small quantity of concentrated $H_2SO_4$ sufficient to promote the reaction. The reflux is continued until completion of the reaction, usually on the order of about 1 hr. The excess acetic anhydride is hydrolyzed with water to acetic acid and removed by evaporation, such as in vacuo on a rotating evaporator.

In a less preferred procedure, the hydroxymethyl compounds are refluxed for about 2–10 hr. with 100% excess acetic anhydride and pyridine in a ratio of about 1:3, v/v, based on the OH value of the starting material.

In the preparation of trichloroacetoxymethyl acetates, the 1-carbonyl is reduced to the corresponding alcohol by hydrogenation in the presence of copper chromite at 280° C. as discussed above. Trichloroacetic acid is then substituted for the acetic anhydride in the acetylation step. Reflux is in the presence of a solvent such as xylene, and water is continuously removed by azeotropic distillation.

When the starting material is ricinoleic acid or an ester thereof, it is to be noted that the 12-hydroxyl is available for acetylation as well as the 9(10)-hydroxymethyl group generated by the hydroformylation and hydrogenation steps. The acetylation reaction of the hydrogenated product would be as follows:

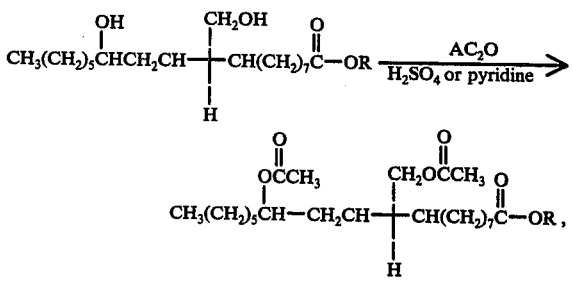

where R represents the same substituents indicated for structures I–IV above.

Any of the commercially available PVC products, which normally have a molecular weight of from 50,000 to 120,000, are suitably compatible with the plasticizer compositions of the invention, and with the various additives which are often included in the plastic formulation. These additives include heat stabilizers such as mixtures of metallic salts based on Pd, Ba, and Cd, and epoxidized oils; fillers and extenders which are usually relatively inexpensive high boiling compositions used to plasticize and extend the volume of the plastic; lubricants; and pigments. Those skilled in the art will know which and how much of the many available additives will be useful in combination with the instant plasticizers to give PVC products having the desired properties.

The instant plasticizers are incorporated in the mixture in amounts from about 5 to 35% by weight and preferably in amounts from about 30 to 32% by weight. At lower concentrations the plasticized product is more rigid, having a higher tensile strength but lower flexibility. At concentrations of below 5% the plasticizer compositions act as processing aids without significantly affecting the properties of the product.

The plasticizers of the invention are not volatilized at fusion temperatures (i.e., about 160° C. for PVC) and therefore remain in the final product.

Fusion of PVC and plasticizer is normally accomplished by combining all the desired ingredients and subjecting the mixture to vigorous mixing at the fusion point temperature. This is preferably done by milling the mixture in a rubber mill, such as a Banbury mixer, at about 160° C. for about 8 min. The fused composition is then transferred to a suitable heat mold which is maintained at 160° C. for about 10 min., then a pressure of about 1,000 p.s.i.g. is applied for about 10 min. while the 160° C. temperature is maintained. The mold is usually cooled to room temperature under pressure.

The following examples are intended only to further illustrate the invention and are not intended to limit the scope of the invention which is defined by the claims.

EXAMPLE 1

A. Preparation of 2-Methoxyethyl 9(10)-acetoxymethylstearate

1. Hydroformylation. Methyl oleate (997 g.) of Hercules Inc. Pamolyn 100 oleic acid methyl esters), 5% rhodium on charcoal (9.97 g.), and triphenylphosphine (9.97 g.) were caused to react with carbon monoxide and hydrogen (1:1) at 110° C. and 1,950 p.s.i.g. for 3 hr. in a 2-liter Autoclave Engineers rocker-shaker autoclave. The product was filtered and the autoclave and catalyst washed with benzene, the benzene was removed under vacuum, and the dark brown product then weighed 1,107 g. Gas-liquid chromatographic (GLC) analysis on a 3% JXR column indicated 94.6% methyl 9(10)-formylstearate.

2. Hydrogenation. The above product (977 g.), wet Raney nickel (89 g.), and absolute ethanol (200 ml.) were placed in the 2-liter rocker-shaker autoclave. Hydrogenation was carried out at 100° C. and 700–1,000 p.s.i.g. for about 2 hr. The product solution was filtered and the ethanol removed under vacuum to produce 983 g. of dark brown product containing 93.7% methyl 9(10)-hydroxystearate. This product (582 g.) was molecularly distilled at 117°–131° C. and less than 0.001 mm. of mercury to give 547 g. of clear, colorless product containing 95.5% methyl 9(10)-hydroxymethylstearate as determined by GLC analysis.

3. Transesterification. 2-Methoxyethanol (570 g.) was placed in a 2-liter round-bottomed flask fitted with a nitrogen inlet, thermometer, condenser, and a drying tube at the top of the condenser. Metallic sodium (5 g.) was added slowly in small pieces, and the solution was heated until all of the sodium dissolved. Methyl 9(10)-hydroxymethylstearate (246 g.) was added, and the solution was refluxed for 20 hr. Conversion to 2-methoxyethyl 9(10)-hydroxymethylstearate was 76.7% as indicated by GLC. Further reaction with additional amounts of 2-methoxyethanol (500 ml.) and sodium (5 g.) for an additional 16 hr. resulted in 95.5% conversion. The solution was neutralized with acetic acid, and the excess 2-methoxyethanol was removed in a rotary evaporator under vacuum. After washing with water to remove salts and stripping to remove ether solvent, there was obtained 251 g. of product containing 88.9% 2-methoxyethyl 9(10)-hydroxymethylstearate.

4. Acetylation. 2-Methoxyethyl hydroxymethylstearate (225 g.), acetic anhydride (400 ml.), and sulfuric acid (1 drop) were heated on a steam bath for 1 hr. After isolation, 213 g. of amber product containing 94.0% 2-methoxyethyl 9(10)-acetoxymethylstearate were recovered. Distillation of 190 g. at 175°–190° C. and 0.02 mm. of mercury yielded 124 g. of product containing 96.0% 2-methoxyethyl 9(10)-acetoxymethylstearate and no free hydroxyl-bearing compounds as determined by infrared absorption.

B. This sample was used to plasticize polyvinylchloride by fusing therewith at the 32% level and gave the results indicated in Table I. The results show that 2-methoxyethyl 9(10)-hydroxymethylstearate is an unusually efficient plasticizer with good low temperature properties, compatibility, heat stability, and low volatility properties.

EXAMPLE 2

A. Preparation of Acetoxymethyl Derivative of High-Oleic Safflower Oil

1. Hydroformylation. High-oleic safflower oil (998 g.), 5% rhodium on carbon (10 g.), and triphenylphosphine (9 g.) were caused to react with carbon monoxide and hydrogen (1:1) in a 2-liter Autoclave Engineers rocker-shaker autoclave at 110° C. and 1,850 p.s.i.g. for about 4 hr. The product solution was filtered through "Celite" diatomaceous earth filter aid on Whatman No. 1 filter paper to recover 1,212 g. of light brown product containing about 90% of hydroformylated oil, as determined by GLC after transesterification to methyl esters.

2. Hydrogenation. The above hydroformylated oil (1,001 g.), wet Raney nickel (59 g.), and absolute ethanol (250 ml.) were placed in a 2-liter rocker-shaker autoclave. Hydrogenation was carried out at 100° C. and 700–1,000 p.s.i.g. for 5½ hr. to yield 903 g. of a light brown product.

3. Acetylation. Hydroxymethylated high-oleic safflower oil (226 g.), acetic anhydride (500 ml.), and concentrated sulfuric acid (1 drop) were heated on a steam bath for 3 hr. The heterogeneous product solution was dark brown. After isolation, the dark red product weighed 253 g. It was then passed through a 50:50 mixture of "Celite" and activated charcoal to remove color. The product contained 91.1% of monoacetoxymethyl derivatives of high-oleic safflower oil as determined by GLC analysis.

B. This product was used to plasticize polyvinylchloride at the 32% level and gave the results indicated in Table I. Compared to the acetoxy derivatives of castor oil and hydrogenated castor oil (Examples 17 and 16, respectively, of Table I), the acetoxymethyl derivative of high-oleic safflower oil imparted improved permanence properties.

EXAMPLE 3

A. Preparation of Acetoxymethyl Derivative of Safflower Oil

1. Hydroformylation. Safflower oil (450 g.), 5% rhodium on charcoal (4.5 g.), triphenylphosphine (2.25 g.), and toluene (50 ml.) were placed in a 1-liter rocker-shaker autoclave. Hydroformylation with 1:1 carbon monoxide and hydrogen was carried out at 90° C. and 3,000–3,200 p.s.i.g. for 5 hr. The catalyst was removed by filtration to give 518 g. of dark brown product. GLC analysis of a transesterified sample on a JXR column indicated 20.4% monoformyl and 67.0% diformyl products.

2. Hydrogenation. Hydroformylated safflower oil (470 g.), wet Raney nickel (37 g.) that had been washed with alcohol, and absolute ethanol (100 ml.) were placed in a 1-liter rocker-shaker autoclave. Hydrogenation was carried out at 100° C. and 1,000 p.s.i.g. for 6 hr. After filtration and removal of solvent, the light brown product weighed 455 g.

3. Acetylation. The hydroxymethyl derivative of safflower oil (115 g.), acetic anhydride (500 ml.), and conc. sulfuric acid (1 drop) were heated to 97° C. on a steam bath for one-half hr. When cooled to room temperature, the product was a clear, amber homogeneous solution. The acetic anhydride was removed under vacuum. To the residue was added 50 ml. of water and the mixture heated on a steam bath for 10 min. After removal of water and acetic acid under vacuum, the clear amber product weighed 136 g. for a recovery of 88.3%. Reduction in color to a light yellow was accomplished by passing the sample through a 50:50 mixture of "Celite" and activated charcoal. Infrared spectral analysis indicated the absence of hydroxyl groups. This product contained 23.9% of monoacetoxymethyl and 69.1% of diacetoxymethyl derivatives of safflower oil.

B. When used to plasticize polyvinyl chloride at a concentration of 32%, the product imparted excellent properties of permanence (Table I) and was found to be superior to commercial plasticizers in this respect.

The acetoxymethyl derivatives of three samples of linseed oil were prepared in Examples 4, 5, and 6. For convenience, the samples were identified as Linseed Oils A, B, and C, respectively. The reaction conditions for each sample were substantially the same except for the following:

(1) pressure of hydroformylation was 3,000–3,600 p.s.i.g. for sample A and 3,800–4,400 p.s.i.g. for samples B and C;

(2) duration of hydrogenation was 5½ hr. for sample A, 6 hr. for sample B, and 6½ hr. for sample C;

(3) acetylation was in the presence of $H_2SO_4$ for 1 hr. for sample A, and pyridine for 8 hr. for samples B and C.

EXAMPLE 4

A. Preparation of Acetoxymethyl Derivative of Linseed Oil A

1. Hydroformylation. Linseed oil (400 g.), 5% rhodium on charcoal (4 g.), triphenylphosphine (2 g.), and toluene (100 ml.) were placed in a 1-liter rocker-shaker autoclave. Hydroformylation with 1:1 carbon monoxide and hydrogen was carried out at 90° C. and 3,000–3,600 p.s.i.g. for 5 hr. After filtration and removal of solvent, the dark brown product weighed 504 g. GLC analysis on a JXR column of the methyl esters obtained by transesterification indicated 36.4% of mono- and 48.2% of di- and triformyl products.

2. Hydrogenation. Hydroformylated linseed oil (470 g.), Raney nickel (53.6 g.), and absolute ethanol (100 ml.) were placed in a 1-liter rocker-shaker autoclave. Hydrogenation was carried out at 100° C. and 700–1,000 p.s.i.g. of hydrogen for 6½ hr. After filtration and removal of solvent, the gray-brown product weighed 477 g. GLC analysis of a methylated and acetylated sample indicated 19.4% of mono-, 21.2% of di-, and 43.5% of trihydroxymethylated derivates of the fatty acids in the linseed oil.

3. Acetylation. The hydroxymethylated linseed oil (125 g.), acetic anhydride (500 ml.), and conc. sulfuric acid (1 drop) were heated on a steam bath at 96° C. for 1 hr. The dark brown but homogeneous solution was cooled, and acetic acid and anhydride were removed in a rotary evaporator. To remove residual acetic anhydride, the product was treated with 50 ml. of water and heated for 10 min. on a steam bath. The water and acetic acid were removed in the rotary evaporator. Infrared analysis showed the absence of hydroxyl and a strong acetate absorption. To remove color, the acetoxymethylated linseed oil (148 g.) dissolved in hexane (400 ml.) was passed through a column of 50:50 "Celite" and activated charcoal. There was recovered 133.7 g. of a clear, light yellow product containing 19.4% of monoacetoxymethyl, 21.2% of diacetoxymethyl, and 50.8% of triacetoxymethyl derivatives of linseed oil A.

B. This product was used to plasticize polyvinylchloride at a 32% concentration and showed outstanding permanence properties as indicated in Table I.

EXAMPLE 5

A. Preparation of Acetoxymethyl Derivative of Linseed Oil B

1. Hydroformylation. Linseed oil (400 g.), 5% rhodium on charcoal (4 g.), triphenylphosphine (2 g.), and toluene (100 ml.) were placed in a 1-liter rocker-shaker autoclave. Hydroformylation with 1:1 carbon monoxide and hydrogen was carried out at 90° C. and 3,800–4,400 p.s.i.g. for 5 hr. After filtration and removal of solvent, the brown product weighed 501 g.

2. Hydrogenation. The hydroformylated linseed oil B (400 g.), wet Raney nickel (80 g.), and absolute ethanol (100 ml.) were charged to a 1-liter rocker-shaker autoclave. Hydrogenation was carried out at 100° C. and 500–1,000 p.s.i.g. of hydrogen for 5 hr. After filtration and removal of solvent, the pale yellow product weighed 383.9 g.

3. Acetylation. The hydroxymethylated linseed oil (202 g.) and 320 ml. of an acetic anhydride-pyridine solution (1:3 v/v) were heated to reflux for 8 hr. After isolation, the yellow-brown product weighed 232.7 g. GLC analysis of a methylated sample showed 18.1% mono-, 18.8% di-, and 55.6% of triacetoxymethylated fatty acids in the linseed oil.

B. This product was used to plasticize polyvinylchloride at the 32% level, and the results are indicated in Table I. It had outstanding permanence properties and was comparable to the acetoxymethyl derivative of linseed oil A in Example 4 above.

EXAMPLE 6

A. Preparation of Acetoxymethyl Derivative of Linseed Oil C

1. Hydroformylation. Two batches of hydroformylated linseed oil were prepared as in Example 5 above and the products combined for further reaction.

2. Hydrogenation. Hydroformylated linseed oil (800 g.), wet Raney nickel that had been washed with ethanol (74 g.), and absolute ethanol (200 g.) were charged to a 2-liter rocker-shaker autoclave. Hydrogenation was carried out at 100° C. and 700–1,000 p.s.i.g. of hydrogen for 6 hr. After removal of catalyst and solvent, the brown product weighed 765 g.

3. Acetylation. The hydroxymethylated linseed oil C was acetylated in the same manner as in Example 5. The product was similar to the acetoxymethyl derivatives of linseed oils A and B in Examples 4 and 5, respectively.

B. The product was used to plasticize polyvinylchloride at the 32% level and exhibited outstanding permanence properties. The results are set forth in Table I.

EXAMPLE 7

A. Preparation of Acetoxymethyl Derivative of Castor Oil

1. Hydroformylation. Castor oil (750 g.), 5% rhodium on calcium carbonate (7.5 g.), triphenylphosphine (3.75 g.), and toluene (250 ml.) were charged to a 2-liter rocker-shaker autoclave. Hydroformylation with 1:1 carbon monoxide and hydrogen was carried out at 110° C. and 1,700–2,000 p.s.i.g. for 3 hr. After removal of catalyst and solvent, the light brown product weighed 831 g.

2. Hydrogenation. The hydroformylated castor oil (750 g.), Raney nickel (80 g.), and absolute ethanol (250 ml.) were charged to a 2-liter rocker-shaker autoclave. Hydrogenation was carried out at 100° C. and 700–1,000 p.s.i.g. of hydrogen for 2 hr. After removal of catalyst and solvent, the beige product weighed 825 g. and had a hydroxyl value of 337.

3. Acetylation. The hydroxymethylated castor oil (125 g.), acetic anhydride (500 ml.), and conc. sulfuric acid (1 drop) were heated on a steam bath for 2 hr. Acetic acid and excess acetic anhydride were removed in a rotary evaporator. To remove residual acetic anhydride, 50 ml. of water were added to the solution which was then heated on the steam bath for 10 min. The water and acetic acid were removed in a rotary evaporator. To remove color, the acetoxymethylated castor oil was dissolved in 500 ml. of diethyl ether, and the solution passed through a 50:50 mixture of "Celite" and activated charcoal. After removal of solvent, the clear, slightly yellow product weighed 116.5 g. The product contained 18.9% monoacetoxymethyl derivatives of castor oil and 79.1% 9(10)-hydroxymethyl-12-hydroxystearates as determined by GLC analysis.

B. This product was used to plasticize polyvinylchloride at the 32% level, and the results are given in Table I. It had outstanding permanence properties compared to acetylated castor oil (Example 17, Table I) or to hydrogenated and acetylated castor oil (Example 16, Table I).

EXAMPLE 8

A. Preparation of Trichloroacetate Derivative of Hydroxymethylated Linseed Alcohols 1. Hydroformylation. Linseed oil methyl esters (697 g.), 5% rhodium on charcoal (7 g.), triphenylphosphine (3.5 g.), and toluene (200 ml.) were placed in a 2-liter rocker-shaker autoclave. Hydroformylation with 1:1 carbon monoxide and hydrogen was carried out at 110° C. and 2,500 p.s.i.g. for 2 hr. After filtration and removal of solvent, the dark brown product weighed 863 g. GLC indicated 22.8% of monoformyl, 39.5% of diformyl, and 24.3% of triformyl products.

2. Hydrogenation. Hydroformylated linseed methyl esters (247.5 g.) and copper chromite (27.5 g., Harshaw Chemical Co. Cul106-P) were placed in an autoclave, and the hydrogenation was carried out first at 150° C. and 3,000 p.s.i.g. for 2½ hr. to reduce the aldehyde groups, then at 270° C. and 3,000 p.s.i.g. for 4 hr. to reduce the ester groups. Palmityl and stearyl alcohols were removed by molecular distillation. The light yellow residue had a hydroxyl number of 427 corresponding to 7.62 milliequivalents per gram.

3. Esterification with Trichloroacetic Acid. Hydroxymethylated linseed alsohols having a hydroxy value of 7.62 milliequivalents per gram (54 g.), trichloroacetic acid (48.6 g.), and xylene (100 g.) were heated to reflux in a 3-necked flask. Water (7.0 ml.) was removed by azeotropic distillation and recycling of xylene through a Dean-Stark trap. The solution was poured into cold water and extracted with diethyl ether. The ether solution was treated with aqueous sodium bicarbonate to remove traces of trichloroacetic acid. After further washing, drying, and removal of solvent, the isolated product weighed 98.0 g. and had a saponification value of 440.9 corresponding to 7.86 milliequivalents of ester per gram. Infrared analysis indicated the absence of hydroxyl groups.

B. This product was used to plasticize polyvinylchloride at 32% concentration. It was initially compatible but showed moderate exudate after 10 da. It possessed good permanence properties and would be useful as a flame-retardant plasticizer in concentrations of somewhat less than 32%.

Table I below compares the PVC plasticizing properties of acetoxymethyl derivatives of Examples 1–8 to various prior art fatty compound derivatives and other plasticizing types such as DOP (Examples 9–24). For purposes of comparison, it is to be noted that an ideal plasticizer for PVC should produce the following properties: a stiffness temperature ($T_f$) below $-40°$ C. a compatibility number ($T_4-T_f$) below $\Delta 30$; a tensile strength above 2,800 p.s.i.; an elongation above 290%; 100% modulus below 1,200 p.s.i.; a migration loss below 3%; and volatility loss below 1%. Migration and volatility losses approaching zero are desirable requirements for a permanent plasticizer. It is worth noting that all known PVC plasticizers exhibit departure from ideality in one or more of these properties, and none is ideal in every respect.

One basic requirement for a plasticizer is that all intermolecular forces be of the same order of magnitude between plasticizer and plasticizer, between polymer and polymer, and between plasticizer and polymer. To be an efficient plasticizer, a low molecular weight compound must have sufficient affinity for the polymer to overcome polymer-polymer interactions. To impart good low temperature flexibility, the compound also must retain enough mobility to participate in the equilibria of the plasticized system, and must be able to diffuse through the system. PVC, containing polar groups, requires polar plasticizers to achieve good compatibility, which depends on the proper kind, number, and arrangement of polar groups in the plasticizer. Ester groups are notable effective polar functions in plasticizers producing compatibility with PVC.

While not desiring to be bound to any particular theory, it is believed that the unexpected PVC plasticizing superiority of the instant novel compounds is attributed primarily to two factors:

(1) sufficiently high polarity imparted by the acetoxymethyl groups to mask the polar sites in the PVC polymer chain and to reduce attraction forces between polymer molecules, giving them freedom of movement as required for desirable flexibility; and (2) the presence of a plurality of acetoxymethyl groups on those products derived from polyunsaturated fatty compounds, made possible by rhodium hydroformylation or an equivalent thereto.

It is to be understood that the foregoing detailed description is given merely by way of illustration and that modification and variations may be made therein without departing from the spirit and scope of the invention.

their lower alkyl esters, and their vegetable oil triglycerides;

b. hydroformylating said fatty compound with carbon monoxide and hydrogen in the presence of an effective catalyst to add a formyl group at substantially each site of unsaturation;

c. hydrogenating the hydroformylated product of step (b) to convert substantially all the formyl groups to hydroxymethyl groups; and d. acetylating the hydrogenated product of step (c) to convert substantially all the hydroxymethyl groups to the corresponding acetoxymethyl derivatives of said fatty compound.

2. The method of preparing a primary plasticizer as defined in claim 1 wherein said fatty compound is a vegetable oil triglyceride selected from the group consisting of safflower oil, oleic safflower oil, linseed oil, castor oil, soybean oil, cottonseed oil, peanut oil, and sunflower seed oil.

3. The method of preparing a primary plasticizer as defined in claim 1, wherein said fatty compound is methyl oleate and wherein said hydrogenated product of step (c) is transesterified to the 2-methoxyethyl ester by reaction with 2-methoxyethanol prior to said acetylation step (d).

4. The method of preparing a primary plasticizer as defined in claim 1, wherein said fatty compound is linseed oil methyl esters, wherein the conditions of said Table I Properties of Polyvinylchloride Plasticized with Acetoxymethyl Derivatives and Prior Art Plasticizers

| Example No. | Plasticizer | Torsional stiffness $T_f$ (C) | $T_4$ (C) | Compatibility No. ($\Delta$) ($T_4$-$T_f$) | Performance Tensile strength (p.s.i.) | Elongation (%) | 100% Modulus (p.s.i.) | Heat stability (hr.) | Permanence Migration loss (%) | Volatility loss (%) |
|---|---|---|---|---|---|---|---|---|---|---|
| 1. | 2-Methoxyethyl-9(10)-(CH$_2$OAc) stearate | −46 | −15 | 31 | 2,660 | 310 | 880 | 7.5 | 16.2 | 1.4 |
| Acetoxymethyl triglycerides: | | | | | | | | | | |
| 2. | Oleic safflower oil | −32 | 20 | 52 | 2,415 | 200 | 1,640 | 8.5 | 6.9 | 2.4 |
| 3. | Safflower oil | −18 | 10 | 28 | 2,910 | 315 | 1,590 | 6.5 | 1.5 | 0.3 |
| 4. | Linseed oil A | −12 | 18 | 30 | 2,805 | 245 | 1,855 | 4.0 | 0.6 | 0.4 |
| 5. | Linseed oil B | −14 | 12 | 26 | 2,890 | 245 | 1,855 | 4.5 | 0.8 | 0.3 |
| 6. | Linseed oil C | −14 | 12 | 26 | 3,075 | 310 | 1,765 | 4.5 | 0.7 | 0.3 |
| 7. | Castor oil | −14 | 12 | 26 | 3,030 | 265 | 1,715 | 8.5 | 0.8 | 0.3 |
| Trichloroacetoxymethyl acetates: | | | | | | | | | | |
| 8. | Linseed oil methyl esters | −10 | 30 | 40 | 2,975 | 265 | 2,260 | 1.5 | 1.2$^a$ | 1.4 |
| Acetoxystearate controls: | | | | | | | | | | |
| 9. | Me 9(10)-acetoxy | −46 | −11 | 35 | 2,795 | 370 | 980 | 9.5 | 16.0 | 3.6 |
| 10. | Bu 9(10)-acetoxy | −50 | −8 | 42 | 2,620 | 270 | 1,020 | 11 | 17.0 | 1.5 |
| 11. | Me 9,10-diacetoxy | −25 | −1 | 24 | 2,840 | 335 | 975 | 11.5 | 4.5 | 1.1 |
| 12. | Bu 9,10-diacetoxy | −33 | 2 | 35 | 2,785 | 450 | 1,295 | 14 | 8.0 | 1.7 |
| 13. | Bu triacetoxy | −14 | 9 | 23 | 3,000 | 320 | 1,335 | 10 | 1.3 | 0.7 |
| Acetyl ricinoleate controls: | | | | | | | | | | |
| 14. | Methyl | −47 | −10 | 37 | 2,675 | 330 | 985 | 8.0 | 13.6 | 5.0 |
| 15. | n-Butyl | −49 | −2 | 47 | 2,795 | 320 | 1,190 | 7.5 | 15.1 | 2.2 |
| Acetyl triglyceride controls: | | | | | | | | | | |
| 16. | 12-Acetoxystearate (castor oil) | −37 | 25 | 62 | 1,420 | 40 | — | 11 | 5.7 | 10.5 |
| 17. | Acetyl ricinoleate (castor oil) | −35 | 22 | 57 | 2,455 | 200 | 1,630 | 9.0 | 9.1 | 7.6 |
| Di(2-ethylhexyl) ester controls: | | | | | | | | | | |
| 18. | Phthalate (DOP)$^b$ | −25 | 4 | 29 | 2,835 | 290 | 1,165 | 6.5 | 3.0 | 1.5 |
| 19. | Phthalate (DOP) | −29 | 1 | 30 | 2,770 | 280 | 1,115 | 10 | 3.9 | 1.3 |
| 20. | Sebacate (DOS)$^c$ | −57 | −11 | 46 | 3,570 | 315 | 925 | 10 | 19.5 | 1.2 |
| 21. | Sebacate (DOS) | −57 | −7 | 50 | 2,355 | 295 | 1,045 | — | 19.3 | 1.6 |
| 22. | Azelate (DOZ)$^d$ | −56 | −12 | 44 | 2,615 | 470 | 1,020 | 10 | 18.7 | 1.5 |
| Polymeric control: | | | | | | | | | | |
| 23. | Plastolein 9720 | −21 | 8 | 29 | 2,830 | 305 | 1,345 | 7.5 | 3.9 | 0.9 |
| Phosphate control: | | | | | | | | | | |
| 24. | Tricresyl | −1 | 18 | 19 | 2,950 | 205 | 1,860 | 1.5 | 0.3 | 0.3 |

$^a$Moderate exudate after 10 da.
$^b$Di-2-ethylhexyl phthalate.
$^c$Dioctyl sebacate.
$^d$Dioctyl azelate.

We claim:

1. A method of preparing a primary plasticizer for polyvinylchloride comprising the following steps:

a. providing a fatty compound selected from the group consisting of $C_{18}$ unsaturated fatty acids, hydrogenation are sufficient to reduce said methyl ester groups to the corresponding alcohols, and wherein said hydrogenated product is acetylated with trichloroacetic acid to produce the trichloroacetoxymethyl acetates of said linseed oil methyl esters.

5. A primary plasticizer for polyvinylchloride comprising the acetoxymethyl derivative of a fatty compound selected from the group consisting of $C_{18}$ unsaturated fatty acids, their lower alkyl esters, and their vegetable oil triglycerides, wherein the number of acetoxymethyl side chains substantially corresponds to the number of sites of unsaturation in said fatty compound.

6. The plasticizer as defined in claim 5 wherein said fatty compound is a vegetable oil triglyceride selected from the group consisting of safflower oil, oleic safflower oil, linseed oil, castor oil, soybean oil, cottonseed oil, peanut oil, and sunflower seed oil.

7. The plasticizer as defined in claim 6 wherein said vegetable oil triglyceride is safflower oil.

8. The plasticizer as defined in claim 6 wherein said vegetable oil triglyceride is linseed oil.

9. The plasticizer as defined in claim 6 wherein said vegetable oil triglyceride is castor oil.

10. The plasticizer as defined in claim 5 wherein said acetoxymethyl derivative has the following structure:

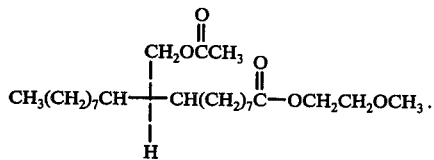

11. The plasticizer as defined in claim 5 wherein said acetoxymethyl derivative has the following structure:

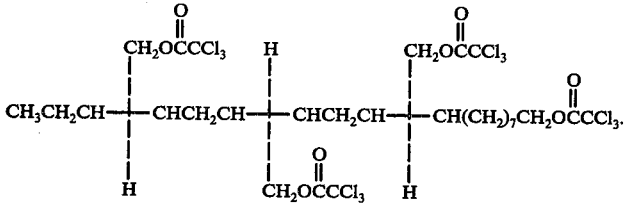

12. A method of preparing a plasticized polyvinylchloride composition comprising the following steps:
   a. providing an acetoxymethyl derivative of a fatty compound selected from the group consisting of $C_{18}$ unsaturated fatty acids, their lower alkyl esters, and their vegetable oil triglycerides, wherein the number of acetoxymethyl side chains substantially corresponds to the number of sites of unsaturation in said fatty compound; and
   b. fusing a plasticizing amount of the acetoxymethyl derivative described in step (a) with polyvinylchloride.

13. The method of preparing a plasticized polyvinylchloride as defined in claim 12 wherein said fatty compound is a vegetable oil triglyceride selected from the group consisting of safflower oil, oleic safflower oil, linseed oil, castor oil, soybean oil, cottonseed oil, peanut oil, and sunflower seed oil.

14. The method of preparing a plasticized polyvinylchloride as defined in claim 12 wherein said acetoxymethyl derivative has the following structure:

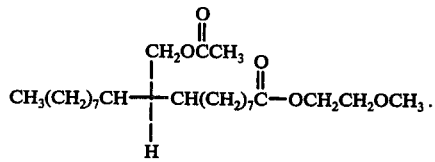

15. The method of preparing a plasticized polyvinylchloride as defined in claim 12 wherein said acetoxymethyl derivative has the following structure:

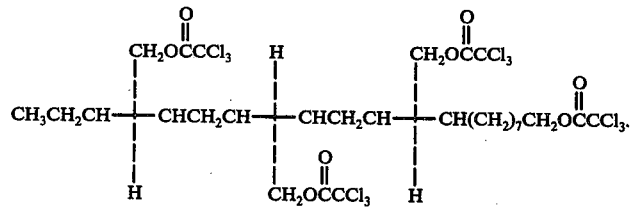

16. In a plasticized polyvinylchloride composition an improvement comprising a plasticizing amount of a primary plasticizer wherein said plasticizer is the acetoxymethyl derivative of a fatty compound selected from the group consisting of $C_{18}$ unsaturated fatty acids, their lower alkyl esters, and their vegetable oil triglycerides, wherein the number of acetoxymethyl side chains substantially corresponds to the number of sites of unsaturation in said fatty compound.

17. A plasticized polyvinyl composition as defined in claim 16 wherein the primary plasticizer is present in an amount equaling from 5 to 35% of the total weight of the composition.

18. A plasticized polyvinyl composition as defined in claim 16 wherein said fatty compound is a vegetable oil triglyceride selected from the group consisting of safflower oil, oleic safflower oil, linseed oil, castor oil, soybean oil, cottonseed oil, peanut oil, and sunflower seed oil.

19. A plasticized polyvinylchloride as defined in claim 18 wherein said vegetable oil triglyceride is safflower oil.

20. A plasticized polyvinylchloride as defined in claim 18 wherein said vegetable oil triglyceride is linseed oil.

21. A plasticized polyvinylchloride as defined in claim 18 wherein said vegetable oil triglyceride is castor oil.

22. A plasticized polyvinylchloride as defined in claim 16 wherein said acetoxymethyl derivative has the following structure:
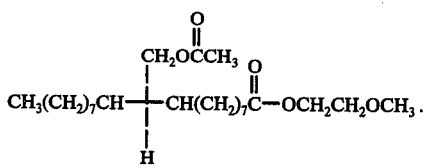
23. A plasticized polyvinylchloride as defined in claim 16 wherein said acetoxymethyl derivative has the following structure:
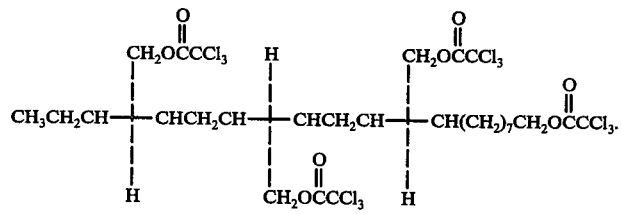
* * * * *